United States Patent [19]
Topsoe

[11] Patent Number: 5,139,757
[45] Date of Patent: Aug. 18, 1992

[54] PROCESS FOR THE REMOVAL OF NITROGEN OXIDES FROM FLUE GASES

[75] Inventor: Haldor F. A. Topsoe, Lyngby, Denmark

[73] Assignee: Haldor Topsoe A/S, Lyngby, Denmark

[21] Appl. No.: 737,404

[22] Filed: Jul. 29, 1991

[30] Foreign Application Priority Data

Aug. 1, 1990 [DK] Denmark ............................ 1839/90

[51] Int. Cl.⁵ ..................... B01J 8/00; C01B 21/00; C01B 17/00
[52] U.S. Cl. ..................................... 423/239; 423/244
[58] Field of Search .................. 423/235, 235 D, 239, 423/239 A, 244 A, 244 R

[56] References Cited

U.S. PATENT DOCUMENTS

3,897,539  7/1975  Fleming ................. 423/235

FOREIGN PATENT DOCUMENTS

3406657  8/1985  Fed. Rep. of Germany .
3431730  3/1986  Fed. Rep. of Germany .
86/1431  3/1986  World Int. Prop. O. .
87/4947  8/1987  World Int. Prop. O. .

*Primary Examiner*—Gregory A. Heller
*Attorney, Agent, or Firm*—Ostrolenk, Faber, Gerb & Soffen

[57] ABSTRACT

Process for the removal of nitrogen oxides in hot flue gas by catalytic reduction with a reducing agent, which process comprises continuously introducing the flue gas into a section of a sectional divided denitration catalyst unit countercurrently with fresh air passing through an other section of the catalyst, and continuously adding the reducing agent into a third section of the catalyst between the section traversed by the flue gas and the section traversed by the air, the third section being traversed by the air before addition of the reducing agent by continuously or stepwise changing the position of the catalyst sections.

5 Claims, 1 Drawing Sheet

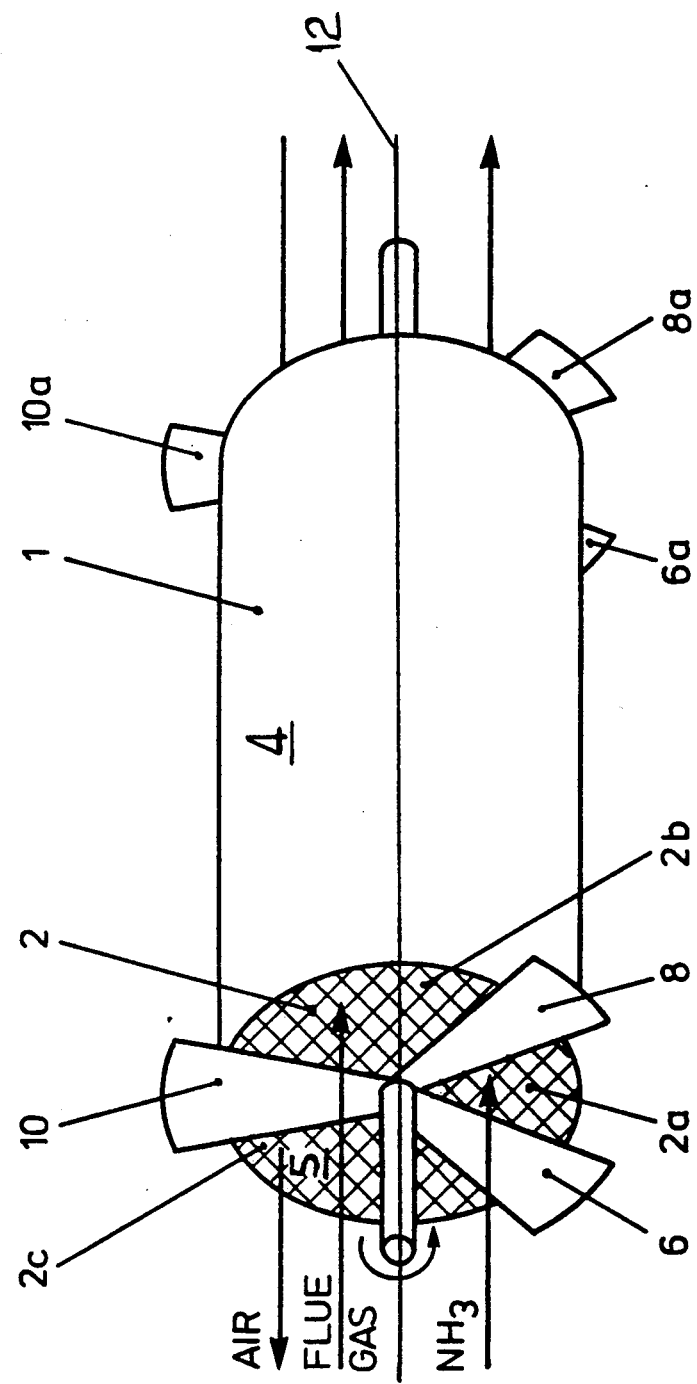

PROCESS FOR THE REMOVAL OF NITROGEN OXIDES FROM FLUE GASES

The present invention is directed to the purification of flue gases. In particular the invention relates to the removal of nitrogen oxides from flue gases by selective catalytic reduction of the nitrogen oxides with a reducing agent adsorbed on the catalytic active surface of a catalyst unit.

Elimination of nitrogen oxides from flue gases is usually accomplished by catalytic reduction of the nitrogen oxides by use of ammonia as reducing agent according to the reactions:

$$4NH_3 + 4NO + O_2 \rightarrow 4N_2 + 6H_2O;$$

$$8NH_3 + 6NO_2 \rightarrow 7N_2 + 12H_2O;$$

These reactions proceed rapidly on a catalyst at elevated temperatures and a number of processes and process units are known in the art, wherein excess of heat in the flue gas is used as a source of heat for the catalytic reduction reactions.

Thereby, ammonia is introduced into hot flue gas before the gas is passed through the catalyst.

However, in order to obtain an efficient reduction of the content of nitrogen oxides in the flue gas, it is necessary to add ammonia in excess of the stoichometric amount according to the above reactions. This implies that a certain amount of ammonia will not be reacted when passing the catalyst. Unreacted ammonia in the flue gas, which usually contains sulphur oxides, may react with these oxides and form ammonium sulphate/ammonium hydrogen sulphate. These compounds are highly undesirable, since they cause clogging of the catalyst or fouling of downstream equipment. To reduce deposition of solid compounds, it has been suggested in DE Offenlegungsschrift No. 3,406,657 to pass flue gas admixed with ammonia through only a single section of the catalyst countercurrently with fresh air in an adjacent catalyst section and varying the position of the catalyst sections in continuous or stepwise manner, so that the section previously swept by flue gas is then swept and purified by fresh air and vice versa.

An improvement of the above method is mentioned in DE Offenlegungsschrift No. 3,431,730. By the disclosed process, ammonia is added to the combustion air, before the air contacts the catalyst and in such a rate, where ammonia is retained on the surface of the catalytic active material in the section of the catalyst, which is traversed by the air.

In a subsequent traversal of flue gas the retained ammonia is consumed by reduction of nitrogen oxides in the flue gas. Thereby, formation of sticky ammonium hydrogen sulphate on the catalyst is reduced and the lifetime of the catalyst extended.

A disadvantage of the above process is, however, that considerable amounts of ammonia will evaporate from the surface and be swept out of the catalyst together with air, before it comes into contact with nitrogen oxides in the flue gas. By introducing ammonia together with air into one catalyst section of a sectional divided catalyst unit the amount of adsorbed ammonia will be large at the inlet side and low at the outlet side of the section swept by the gas mixture, which leads to an undesirable concentration profile of adsorbed ammonia in the section, being traversed by the hot flue gas after rotation. Thereby, the flue gas, with a high content of nitrogen oxides at the introduction side of the catalyst section, meets a low concentration of adsorbed ammonia at the inlet side and a high concentration of ammonia at the outlet side of the catalyst section, where the nitrogen oxide content in the flue gas is reduced by catalytic conversion with ammonia retarded in the catalyst section.

It has now been found that addition of reducing agent into a separate section of the denitration catalyst, after traversal of air, allows introduction of ammonia in parallel flow with the flue gas in an adjacent catalyst section, and provides an improved concentration profile of reducing agent adsorbed on the catalyst and hence an improved process for the removal of nitrogen oxides in flue gases.

Accordingly, the object of the present invention is to provide a process for the removal of nitrogen oxides in hot flue gas by catalytic reduction with a reducing agent, which process comprises introduction of the flue gas into a section of a sectional divided denitration catalyst unit countercurrently with fresh air in another section of the catalyst, and adding continuously the reducing agent into a third section of the catalyst between the section traversed by the hot flue gas and the section traversed by fresh air, the third section being traversed by the air before the addition of the reducing agent by continously or stepwise changing the position of the catalyst sections.

The catalyst for use in the inventive process may be of any geometrical shape. Catalysts with a large void and with a plurality of parallel gas channels in the catalyst structure, such as the known honeycomb catalyst, are preferred. The catalytic active material may comprise any of the metal oxides, which are active in the reduction of nitrogen oxides. In a preferred embodiment of the invention, the material comprises vanadium pentoxide on a carrier consisting of titania, silica and/or alumina, such as the catalyst described in U.S. Pat. No. 4,781,902, the disclosure of which is incorporated herein by reference.

In still a preferred embodiment of the invention, the carrier comprises zeolitic material, enhancing the absorption of ammonia.

To facilitate changing of the position of the catalyst sections the catalyst unit is arranged as cylindrical chamber having open faces and being rotable around its axis.

In the catalyst chamber the catalyst section being traversed by hot flue gas, leaving e.g. the economizer of a power plant with a temperature of about 250°–450° C., is heated to temperatures, where the catalytic reduction of nitrogen oxides proceeds. Due to the rotation of the catalyst chamber the hot catalyst section having been in contact with flue gas is subsequently cooled by cold fresh air, passing through this section with an inlet temperature of about 20°–30° C. Ammonia is added continously into this section after further rotation of the catalyst chamber immediately before the section meets the stream of nitrogen oxide containing hot flue gas.

Separately introduction of ammonia into a separate catalyst section allows introduction in parallel flow with the flue gas and thus a more precise dosage and distribution profile of the amount of ammonia in the catalyst section required for the catalytic reduction of nitrogen oxides in the flue gas after the section is rotated to meet the stream of flue gas.

In further a preferred embodiment of the invention the catalyst is arranged in a recuperative heat exchanger, wherein air flowing through the catalyst chamber countercurrently with the hot flue gas is preheated for further use as combustion air in a power plant, and the nitrogen oxides containing flue gas from e.g. the power plant is catalytically purified.

BRIEF DESCRIPTION OF THE DRAWING

The invention is further described in the following with reference to the drawing, in which the Figure is a perspective view of a catalyst chamber for use in the process for removal of nitrogen oxides according to one embodiment of the invention.

The Figure shows in simplified manner catalyst chamber 1 with a honeycomb structured denitration catalyst 2 arranged within cylindrical shell 4 of the catalyst chamber. The catalyst chamber 1 is traversed by the gases in 3 different sections, section 2a for continuous introduction of ammonia, section 2b for traversal of flue gas, and section 2c for traversal of air countercurrently to the stream of flue gas, by sectionally sealing the faces of the catalyst chamber with sealing baffles 6, 8 and 10 mounted movable in a gastight manner on face 5 and on the opposite face (not shown) of the catalyst chamber, which is similarly sealed by sealing baffles 6a, 8a and 10a. Within the sealing baffles the catalyst chamber 1 is rotable around its axis 12, thereby providing a continously passage of catalyst 2 through sections 2a, 2b and 2c.

Ammonia is continously introduced into section 2a in parallel flow with the flue gas in section 2b and adsorbed on the catalyst surface within this section. Thereby, most of the ammonia is retarded at the inlet side of the section 2a leading to a concentration profile of ammonia with decreasing amounts towards the outlet side of the section. Having passed section 2a, the catalyst 2 is rotated to section 2b, where hot flue gas is introduced and passed through the catalyst. Nitrogen oxides contained in the flue gas are catalytically reduced with the ammonia adsorbed on the catalyst surface to molecular nitrogen and water according to the aforementioned reaction scheme.

By passage of the hot flue gas through the catalyst 2 in section 2b, the catalyst section is heated, which heat is partly used to initiate and accomplish the catalytic reduction of nitrogen oxides. Part of the heat is after rotation further transferred to the air, which is introduced into section 2c, countercurrently to the hot flue gas in section 2b.

I claim:

1. A process for the removal of nitrogen oxides from hot flue gas containing the nitrogen oxides and sulfur oxides by catalytic reduction of the nitrogen oxides with ammonia, the process comprising the steps of continuously introducing the flue gas into a section of a sectionally divided denitration catalyst-containing unit countercurrently with fresh air passing through another section of the catalyst, and continuously adding the ammonia into a third section of the catalyst located between the section traversed by the flue gas and the section traversed by the air, the third section being traversed by the air before addition of the ammonia by continuously or stepwise changing the position of the catalyst sections.

2. The process as claimed in claim 1, wherein the catalyst is in form of a honeycomb structured catalyst.

3. The process as claimed in claim 1, wherein the catalyst comprises vanadium pentoxide supported on titania, alumina and/or silica.

4. The process as claimed in claim 1, wherein the catalyst is supported on zeolitic material.

5. The process as claimed in claim 1 wherein the catalyst is arranged in a recuperative heat exchanger.

* * * * *